Patented Aug. 19, 1947

2,426,080

UNITED STATES PATENT OFFICE 2,426,080

PHOTOCHEMICAL CHLORINATION OF POLYVINYL CHLORIDE

James Chapman, Halewood, near Liverpool, and John William Croom Crawford, Frodsham, via Warrington, England, assignors to Imperial Chemical Industries Limited, a corporation of Great Britain No Drawing. Application February 20, 1942, Serial No. 431,652. In Great Britain April 9, 1941

5 Claims. (Cl. 204—163)

This invention relates to the chlorination of polyvinyl chloride.

It has already been proposed to chlorinate polymerised vinyl chloride by acting with chlorine on a solution of the polymer, for instance in tetrachloroethane. It has been observed, however, that when polyvinyl chloride is chlorinated in this way the time required for the material to attain a predetermined desired chlorine content may vary considerably from batch to batch, and the further observation has been made that the properties of materials produced with the same chlorine content vary with the time of chlorination. The variation has been found most marked with material produced from polyvinyl chloride prepared by polymerising the monomeric vinyl chloride in solution in a non-aqueous solvent, or in the absence of any added solvent.

The disadvantages of such a process from the commercial point of view will at once be apparent, as in the present state of the art it is difficult to control the properties of the product.

According to the present invention the chlorination of polyvinyl chloride is carried out in solution in an organic solvent containing a small proportion of water. Advantageously, the amount of water present is such that it is soluble in the solution of polyvinyl chloride used. If desired, a swelling agent may also be present.

By carrying out the chlorination in the presence of small amounts of water in this manner, irregularities in the properties of the product can be largely avoided, and in addition the rate of chlorination is accelerated; so much so that even at ordinary temperatures chlorination proceeds at a technically useful rate, whereas in the absence of the water, elevated temperatures are needed for the practical operation of the process.

Suitable organic liquids which may be used as solvents are the trichloroethanes, the tetrachloroethanes, and pentachloroethane or mixtures of these, while a suitable swelling agent, i. e., an agent which by itself causes swelling of polyvinyl chloride but which does not dissolve it, is carbon tetrachloride. Quite small amounts of water have a marked effect on the rate at which chlorination can be carried out, and the effect increases rapidly with the amount of water present to a value beyond which further increase in water content of the reaction mixture produces only slight additional effect, the advantage of which is offset by the increased corrosion of the materials of construction of the plant. This increase of chlorination rate is illustrated by the following table which shows directly the rate of chlorination of a polyvinyl chloride made by polymerising vinyl chloride in a non-aqueous solvent. A solution of 2.25 kilos. of polyvinyl chloride in 36 kilos. of tetrachloroethane was treated at 95° C. with gaseous chlorine in excess. The rate of evolution of hydrogen chloride which was measured is directly proportional to the rate of chlorination.

| Per Cent by Weight of Added Water | Rate of Evolution of HCl from Polyvinyl Chloride in grams/hr. |
|---|---|
| 0.06 | 23.9 |
| 0.12 | 80.8 |
| 0.18 | 96.9 |
| 0.31 | 98.8 |
| 0.65 | 115.0 |
| 1.06 | 134.5 |

The speed of chlorination is, therefore, controllable by two methods. Either the amount of water present may be accurately controlled and the chlorine introduced at a rate in excess of that required for the desired speed of chlorination, or sufficient water may be added to give a very rapid reaction while the speed is controlled by adjusting the rate of addition of chlorine. Since the reaction rate varies very rapidly with the very small amounts of water, and addition of such quantities involves very accurate measurement which is not always convenient in large scale working, the second method of control is considered to be the more suitable. Advantageously water is present in quantities which are completely soluble in the reaction mixture at the temperature of operation. In the case of tetrachloroethane, therefore, quantities of water up to 1.0% by weight of the reaction mixture are preferred when chlorination is carried out at elevated temperatures, e. g., 80° to 120° C.

The polyvinyl chloride to be used for the purposes of this invention may be obtained in any known manner, for example, by polymerising an aqueous emulsion or a non-aqueous solution of vinyl chloride and isolating the solid resin therefrom. The polyvinyl chloride may also be polymerised without any added solvent or emulsifying medium.

In carrying out our invention chlorine is passed into the solution of polymerised vinyl chloride containing small amounts of water until the desired degree of chlorination has been effected.

We prefer to continue the chlorination until the product contains at least 60% chlorine, for example between 60% and 70% chlorine, since thereby a product is obtained which has enhanced solubility in the usual organic solvents for chlorinated polyvinyl chloride, and thus makes the material more suitable as a constituent in, for example, lacquers. The reaction may be promoted by agitating the reaction mixture, and although temperature down to room temperatures can be employed, we prefer to employ temperatures above 60° C., e. g., between 80° C. and 120° C. The chlorination may also be carried out while exposing the solution to actinic radiation, e. g., visible light. When the chlorination has been effected dissolved chlorine and hydrogen chloride may be removed by blowing air or nitrogen into the reaction medium, and the chlorinated polyvinyl chloride then recovered by any suitable means. Thus the solution may be cooled, e. g., to −20 or −30° C. and the desired product precipitated with an alcohol, suitably methyl or ethyl alcohol and filtered off.

The products are useful for the production of films or moulded articles, and as ingredients of coating compositions.

The following examples illustrate but do not limit our invention, all parts being parts by weight. In Examples 1–7 the polyvinyl chloride was made by polymerising the vinyl chloride in a non-aqueous solvent.

*Example 1*

In a vessel fitted with a stirrer, a reflux condenser and heating means, were charged 36,000 parts of sym.-tetrachloroethane, 2,250 parts of polyvinyl chloride and 67.5 parts of water. The temperature of the mixture was then raised to 98° C. and when the polyvinyl chloride had dissolved in the tetrachloroethane, chlorine gas was passed into the solution at the rate of 396 parts per hour. The chlorination was accelerated by exposing the solution to the light from an electric lamp. After 3.25 hours, the stream of chlorine was stopped and hydrogen chloride and unreacted chlorine were blown off in a stream of air. The solution was then cooled to between −20° and −30° C., and the product precipitated by stirring vigorously and adding methanol. The product so obtained had a chlorine content of 63.3%.

*Example 2*

36,000 parts of tetrachloroethane, 2,250 parts of polyvinyl chloride and 250 parts of water were heated to between 95° C. and 97° C. in a stirred vessel as in Example 1, and when the polyvinyl chloride had dissolved chlorine gas was passed into the illuminated solution at such a rate that excess chlorine was easily detectable in the exit gases from the vessel. After 3.4 hours the chlorine stream was stopped and the mixture air-blown. The chlorinated polyvinyl chloride was precipitated from the solution by cooling to between −20° C. and −30° C. and adding methanol with vigorous stirring. The product had a chlorine content of 63.7%.

*Example 3*

2,250 parts of polyvinyl chloride and 34 parts of water were dissolved in 36,000 parts of tetrachloroethane at 94°–98° C. and illuminated as in Example 1. Excess chlorine was then passed in, and after 4.1 hours the product was air-blown and precipitated with methanol as in Example 1. It was found to contain 63.0% chlorine.

*Example 4*

2,250 parts of polyvinyl chloride, 67.5 parts of water and 36,000 parts of tetrachloroethane were heated together to 97° C. in the absence of light in a stirred vessel with reflux condenser. When the polyvinyl chloride had dissolved, chlorine gas was passed into the solution at a rate of 396 parts per hour for 4.25 hours. The mixture was then air-blown and the product isolated by precipitation with methanol as in Example 1. It was found to contain 64.3% chlorine.

*Example 5*

2,250 parts of polyvinyl chloride, 67.5 parts of water and 36,000 parts of tetrachloroethane were heated together to 98° C. in a stirred vessel fitted with a reflux condenser. When the polyvinyl chloride had dissolved, chlorine gas was passed into the solution illuminated by an electric lamp at a rate of 127 parts per hour for 14 hours. The solution was then air-blown and the product which was isolated by precipitation with methanol, as in Example 1, had a chlorine content of 64.4%.

*Example 6*

300 parts of polyvinyl chloride, 4800 parts of tetrachloroethane and 15 parts of water were stirred together until the polyvinyl chloride had dissolved. Excess chlorine was then passed into the solution at room temperature under the illumination of an electric lamp. After 10 hours the product was isolated as described in Example 1 and was found to contain 67.5% chlorine.

For purposes of comparison the process of this example was repeated with the exception that the chlorination was carried out under anhydrous conditions, and it was found that the product contained only 59.7% chlorine.

*Example 7*

200 parts of polyvinyl chloride, 10 parts of water and 3920 parts of pentachloroethane were heated together at 90–100° C. in a stirred vessel, until the polyvinyl chloride had dissolved. Excess chlorine was then passed into the solution at 90–100° C. under illumination from an electric lamp. After 6.6 hours the product was isolated as in Example 1 and contained 64.5% chlorine.

*Example 8*

2,250 parts of polyvinyl chloride, prepared from an aqueous emulsion of vinyl chloride, and 67.5 parts of water were dissolved in 36,000 parts of tetrachloroethane at 95–98° C. and illuminated as in Example 1. Excess chlorine was then passed in and after 7.75 hours the product was air-blown and precipitated with methanol. On analysis it was found to contain 63.6% chlorine.

*Example 9*

2,250 parts of polyvinyl chloride, prepared by polymerising vinyl chloride in a non-aqueous medium, 112 parts of water and 36,000 parts of tetrachloroethane were heated together at 94–98° C. and illuminated as in Example 1. When the polyvinyl chloride had dissolved, chlorine gas was passed into the solution at a rate of 1,046 parts per hour for 1.6 hours. The mixture was then air-blown and the product, precipitated by addition of methanol as in Example 1, was found to contain 64.8% chlorine.

We claim:

1. In a process for the manufacture of chlorinated polyvinyl chloride the steps comprising adding water and polyvinyl chloride to an organic solvent therefor to form a solution of polyvinyl chloride containing between 0.12% and 1.0% by weight of water, and passing chlorine into said solution.

2. In a process for the manufacture of chlorinated polyvinyl chloride the steps comprising adding water and polyvinyl chloride to an organic solvent therefor to form a solution of polyvinyl chloride containing between 0.12% and 1.0% by weight of water, and passing chlorine into said solution at a temperature above 60° C.

3. In a process for the manufacture of chlorinated polyvinyl chloride the steps comprising adding water and polyvinyl chloride to an organic solvent therefor to form a solution of polyvinyl chloride containing between 0.12% and 1.0% by weight of water, and passing chlorine into said solution at a temperature between 80° C. and 120° C.

4. In a process for the manufacture of chlorinated polyvinyl chloride the steps comprising adding water and polyvinyl chloride to an organic solvent therefor taken from the group consisting of trichloroethanes, tetrachloroethanes, and pentachloroethanes to form a solution of polyvinyl chloride containing between 0.12% and 1.0% by weight of water, and passing chlorine into said solution.

5. In a process for the manufacture of chlorinated polyvinyl chloride the steps comprising adding water and polyvinyl chloride, to sym.-tetrachloroethane to form a solution of polyvinyl chloride containing between 0.12% and 1.0% by weight of water, and passing chlorine into said solution.

JAMES CHAPMAN.
JOHN WILLIAM CROOM CRAWFORD.

REFERENCES CITED

The following references are of record in the file of this patent:

UNITED STATES PATENTS

| Number | Name | Date |
|---|---|---|
| 1,248,065 | Blanc | Nov. 27, 1917 |
| 1,982,765 | Schonberg | Dec. 4, 1934 |
| 2,212,786 | McQueen | Aug. 27, 1940 |
| 2,291,574 | Gleason et al. | July 28, 1942 |

OTHER REFERENCES

Industrial and Engineering Chemistry, vol. 28, 1936, pages 333–339.

Artificial Sunlight, by Luckiesch, published in 1930 by D. Van Nostrand Co. Inc., page 116.